C. V. FOOTE.
FILM REWINDING DEVICE.
APPLICATION FILED AUG. 15, 1911.
1,138,205.
Patented May 4, 1915.
3 SHEETS—SHEET 1.
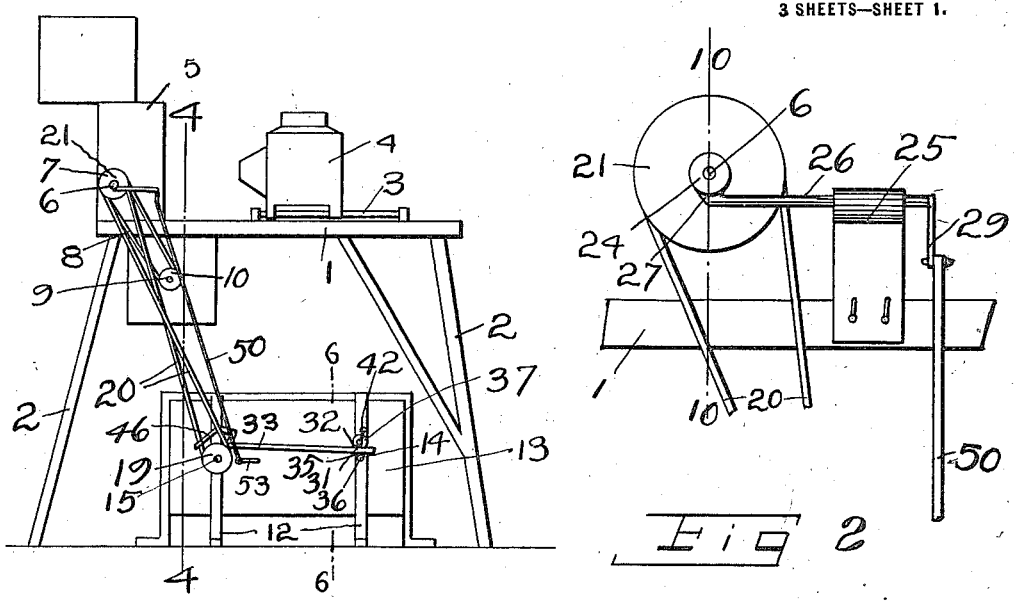
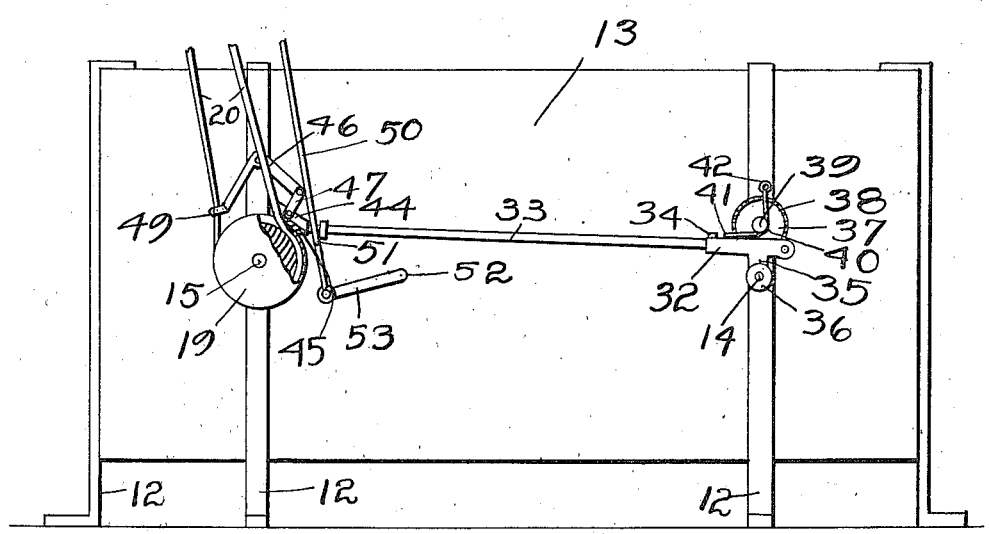
Witnesses
Herbert H. Porter
H. R. Parsons
Inventor
CHARLES V. FOOTE
By Harry Ell. Channer
Attorney

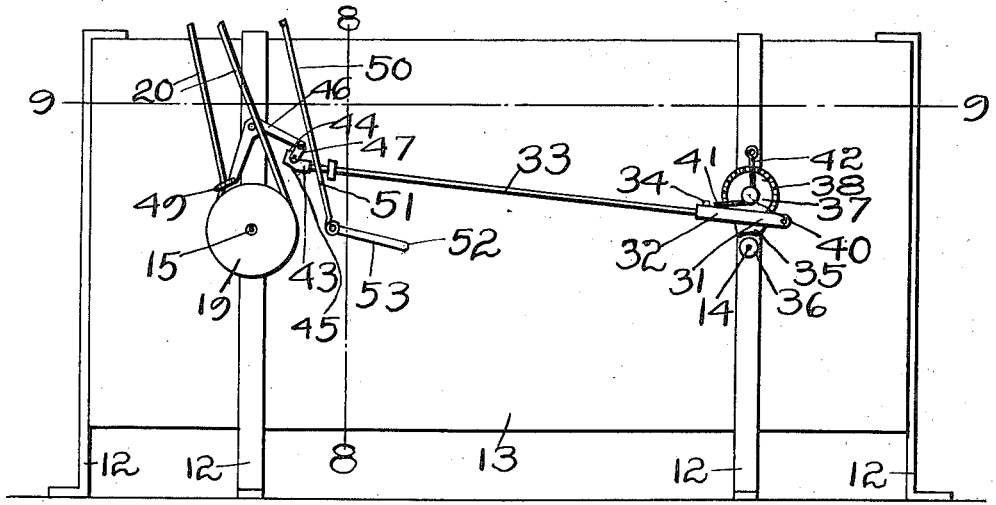
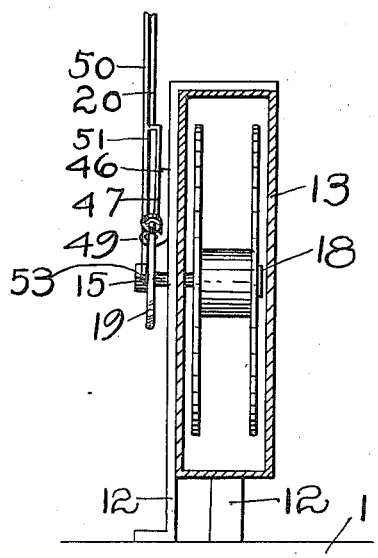
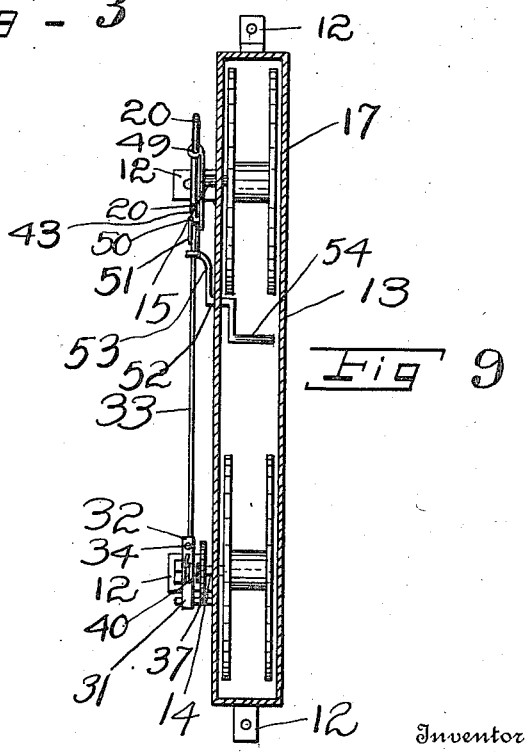

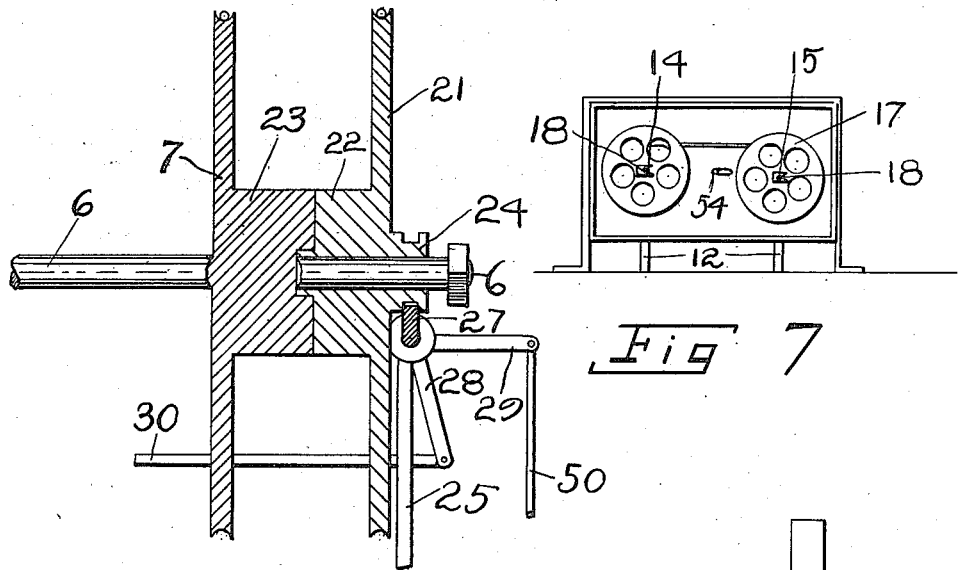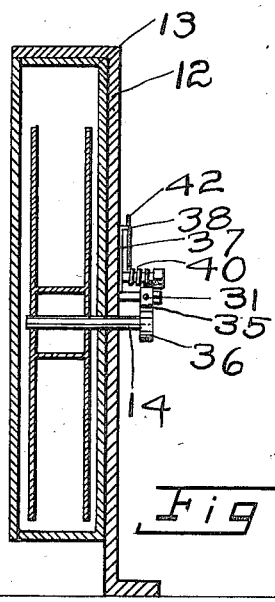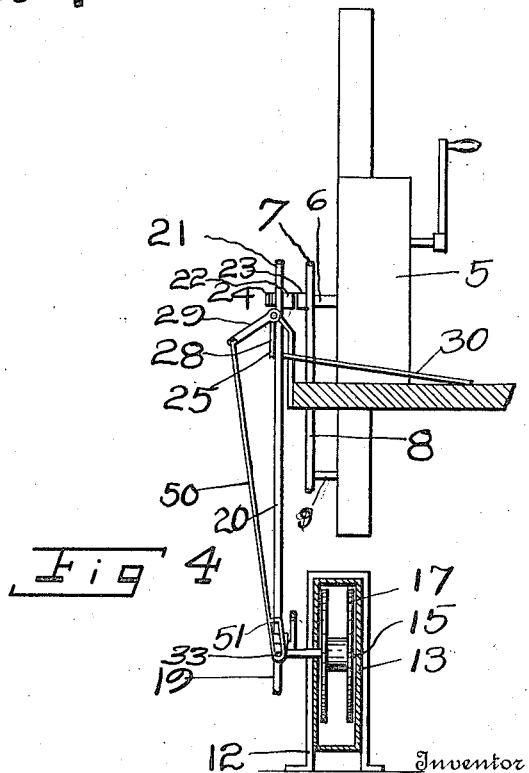

UNITED STATES PATENT OFFICE.

CHARLES V. FOOTE, OF NEPHI, UTAH.

FILM-REWINDING DEVICE.

1,138,205.  Specification of Letters Patent.  Patented May 4, 1915.

Application filed August 15, 1911.  Serial No. 644,166.

*To all whom it may concern:*

Be it known that I, CHARLES V. FOOTE, a citizen of the United States, residing at Nephi, in the county of Juab and State of Utah, have invented certain new and useful Improvements in Film-Rewinding Devices, of which the following is a specification.

My invention relates to improvements in moving picture machines, and has for its leading object the provision of an improved attachment therefor for use in rewinding one film ready to be again displayed while another film is being unwound and thrown onto a screen by the machine.

The further object of my invention is the provision of an improved film rewinding attachment for moving picture machines which will be driven by the power operating the kinetoscope to rewind the film at the same time that another film is being displayed and which will be provided with means for automatically stopping the rewinding either when the film is entirely rewound or upon breaking of the film being rewound.

Other objects and advantages of my improved film rewinding attachment for moving picture displaying machines will be readily apparent by reference to the following description taken in connection with the accompanying drawings and it will be understood that I may make modifications in the specific structure shown and described within the scope of my claims without departing from or exceeding the spirit of my invention.

Figure 1 represents a side elevation of a motion picture machine equipped with my improved rewinding attachment. Fig. 2 represents an enlarged side elevation of the upper portion of my attachment. Fig. 3 represents an enlarged side elevation of the rewinding box and parts secured thereto. Fig. 4 represents a sectional view on the line 4—4 of Fig. 1. Fig. 5 represents an enlarged side elevation of the device as illustrated in Fig. 3, but showing the parts shifted to apply the brake and throw out the clutch. Fig. 6 represents a sectional view on the line 6—6 of Fig. 1. Fig. 7 represents a view of the interior of the rewinding box showing a pair of film reels in position therein. Fig. 8 represents a sectional view on the line 8—8 of Fig. 3. Fig. 9 represents a sectional view on the line 9—9 of said figure, and Fig. 10 represents a sectional view on the line 10—10 of Fig. 2.

In the drawings in which similar characters are employed to denote corresponding parts throughout the several views, the numeral 1 designates the table or supporting platform of a moving picture machine having the suitably braced legs 2 and having secured thereon the guides 3 for the lantern 4. Secured at the front end of the table 1 is the suitably driven film displaying mechanism 5 including a shaft 6 bearing a pulley 7 around which passes a belt 8 for driving the film winding shaft 9 which serves to draw downward the film which is being displayed. The film drawn down by the rotation of the shaft is wound upon a reel 10 but it is necessary to unwind the film from said roll onto another reel before the film may be again displayed, and the object of my invention is to provide means for readily winding a film onto a reel from which it may be displayed as the reel 10 is receiving another film. To attain this result I secure to the floor 11 on which the supporting legs rest the bracket legs 12 which are secured to the film rewinding box 13 having journaled therein the reel bearing shaft 14 and the rewinding reel bearing shaft 15. To rotate the shaft 15 and thus the reel 17 locked thereon by the usual locking plate 18, I secure on the outer end of the shaft 15 the groove pulley 19 around which passes the crossed belt 20 also passing around the grooved pulley 21 which is rotatably mounted on the end of the shaft 6. Said pulley 21 has the clutch collar 22 projecting from the inner face thereof for engaging the clutch 23 secured on the shaft 6 to cause the pulley to rotate with the shaft, a shift collar 24 projecting from the opposite face of the pulley to control the clutch. To shift the pulley 21 and thus to operate the clutch I adjustably secure to the side of the table 1 the bracket 25 having rotatably supported by its upper end the shift rod 26 having a yoke 27 engaging the shift collar 24 and having the arms 28 and 29 projecting therefrom for rocking the rod to shift the pulley. A lever 30 is secured to the arm 28 and extends across the table 1 for rocking the rod 26 to operate the clutch.

To automatically operate the clutch, I have provided my combined tension or brake device and clutch shifter. Pivoted to one of the bracket legs 12 is the rear end of the brake lever 31 having a sleeve portion 32 in which is adjustably held the controlling rod 33 locked in position by the set screw 34. Said brake lever has secured to its under face the brake shoe 35 adapted to bear against the brake drum 36 secured on the end of the shaft 14. To force the lever downward onto the brake drum, I secure to the leg 12 the disk 37 having the ratchet teeth 38; while wound on the bolt 39 is a helical spring 40 having a projecting end 41 bearing down upon the brake lever and having its other end 42 engaged by one of the teeth 38, the engagement of said end on different teeth 38 adjusting the tension of the spring.

Secured on the forward end of the rod 33 is the sleeve 43 bearing the slotted guide portion 44 having a shoe 45 adapted to normally rest against and serve as a brake on the pulley 19. The portion of the belt 20 drawn upward by the rotation of the pulley 21 passes between the furcations of the guide 44 and as the belt is tensed forces the guide 44 upward to relieve the brake drum and the pulley 19 from the pressure thereagainst. To keep the belt stretched tightly over the pulleys as the guide 44 is raised, I pivot to one of the legs 12 the bell crank 46 having one arm connected by the link 47 with the guide 44, while the other arm of the bell crank is provided with a guide ring 49 through which the looser portion of the belt passes downward. As the guide 44 is raised it serves to swing the bell crank 46 on its pivot to shift the ring 49 and thus to keep the belt tight as is clearly shown in the drawings.

It will thus be seen that as long as there is a resistance to the rotation of the pulley 19 on account of its shaft winding a film the upwardly extending portion of the belt 20 will be kept tense to hold upward the forward portion of the rod 33 but when the film is entirely wound or the machine is stopped there being no resistance to keep the belt tense the spring 40 will serve to swing the rod downward. To shift the pulley 21 to throw out the clutch upon the downward movement of the rod 33, I employ the rod 50 which is pivoted at its upper ends to the arm 29 of the rod 26 and has at its lower end the loop 51 through which the rod 33 passes. As the rod 33 swings downward it strikes the bottom of the loop 51 and draws the rod 50 downward to throw out the clutch. The spring 40 continues the movement of the rod 33 to simultaneously apply the brakes to the brake drum 36 and pulley 19 to stop the feed and rewinding reels.

If it is desired to supplement the action of the descent of the rod 33 in checking the movement of the belt 20 by throwing out the clutch, I may rotatably engage in the side of the rewinding box 13 the spindle 52 having on one end the rock arm 53 pivoted to the depending end of the rod 50 and having on the other end of the crank portion 54 adapted to be engaged and moved upward by contact therewith of the clip on the end of the picture film, the upward movement of the crank 54 drawing the rod downward to throw out the clutch.

From the foregoing description taken in connection with the accompanying drawings the construction of my improved film rewinding attachment for motion picture machines will be readily apparent and it will be seen that I have provided an extremely satisfactory and efficient device of this character which may be easily secured upon any ordinary motion picture machine of either manually driven or power operated type and which will serve to satisfactorily rewind one film while another is being displayed by the machine and which is so constructed as to automatically throw out the clutch of the rewinding attachment when the film has been entirely wound, when the machine is stopped, or when a break occurs in the film to be rewound, thus preventing damaging of the rewound film by whirling of the same after it has been rewound.

I claim:

The combination with a rotating shaft, of a pulley having a part loosely mounted on the shaft, a clutch for operatively connecting the pulley and shaft, a rewinding box having feed and rewinding shafts rotatably mounted therein, a drum for the feed shaft, a sheave secured on the rewinding shaft, a cross belt connecting the pulley and sheave a rod positioned between the rewinding and feed shafts, brake shoes mounted upon the ends of the rod and adapted to engage the sheave and drum, respectively, a tensioning device carried by one end of the rod and engaged by the crossed belt, whereby tensioning of the belt will shift the brake shoe out of engagement with the sheave, and means for throwing out the clutch upon slacking of the belt.

In testimony whereof I affix my signature in presence of two witnesses.

CHARLES V. FOOTE.

Witnesses:
 SALOME BROWN,
 DELILA SALESBURY.